United States Patent Office 2,932,653
Patented Apr. 12, 1960

2,932,653

PREPARATION OF α-HALO-α-ACETO-γ-BUTYROLACTONES

William E. Stieg, Mystic, Conn., assignor to Chas. Pfizer & Co., Inc., New York, N.Y., a corporation of Delaware No Drawing. Application July 8, 1957
Serial No. 670,377

7 Claims. (Cl. 260—343.6)

This invention relates to the preparation of certain haloacetobutyrolactones, and specifically, α-chlor-α-aceto-γ-butyrolactone and α-bromo-α-aceto-γ-butyrolactone. These substances are key intermediates in the synthesis of the thiazole fragment of thiamin. They may be considered to have the formula

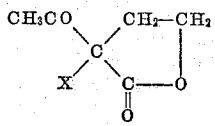

wherein X is chlorine or bromine.

An object of this invention is the obtainment of these valuable intermediates in excellently high yield and quality. This and other objects of the invention are realized by halogenating α-aceto-γ-butyrolactone with either chlorine or bromine in a carefully formulated solvent medium. This solvent medium comprises a lower alkanoic acid having from 2 to 4 carbons in its chain and containing an acid acceptor which should be an alkali metal or alkaline earth metal salt of 2-4 carbon alkanoic acid. It has surprisingly enough been found that under these conditions the acetobutyrolactone is selectively halogenated and the monochloro- or monobromo-substituted product is recovered in excellent yield.

The lower alkanoic acids which are useful as solvents are acetic acid, propionic acid, n-butyric acid, isobutyric acid and substituted alkanoic acids of this type such as chloracetic acid. Preferred solvents are those which are naturally liquid at the usual reaction temperatures (generally room temperature up to the boiling point of the solvent, and preferably 20°–60° C.). The solvent medium is also best kept substantially anhydrous, although a small proportion of water may be tolerated therein. Too great water content may convert the acetobutyrolactone to acetohydroxybutyric acid, which then may be decarboxylated in a side reaction, thus inhibiting the selectivity of the halogenation and resulting in lower yields of the desired product. Accordingly, the solvent medium should preferably contain less than ten percent of water by weight.

The acid acceptor is preferably, but not necessarily, a salt of the same alkanoic acid with an alkali metal or an alkaline earth metal. This salt may be formed in situ by adding the corresponding metal hydroxide, carbonate, bicarbonate, etc. to the medium; or the salt may be added directly. The acid acceptor has been found to neutralize the hydrogen halide produced as a by-product of the halogenation and to prevent destructive side reactions. Examples of useful acceptors are the sodium, potassium, calcium, magnesium and barium acetates, propionates, butyrates and isobutyrates. For reasons of economy and ready availability, the system of sodium acetate in glacial acetic acid is generally preferred.

Since the halogenation effects the introduction of one atom of chlorine in each mole of the acetobutyrolactone, it is generally best to react the lactone starting material with about an equimolar quantity of chlorine or bromine. However, if desired, amounts somewhat below or above this figure can be used, say from 0.8 to 1.2 moles of halogen per mole of the starting lactone. Obviously, sufficient of the alkanoic acid should be employed to render the reaction medium fluid. Usually the solvent is used in the proportion of 1.5 to 5 volumes per volume of the acetobutyrolactone. The proportion of acid acceptor employed may vary widely, depending on the other reactants and reaction conditions. Usually at least sufficient is used to dissolve in the solvent medium to the point of saturation, and preferably an excess is added so that some of the salt is undissolved and remains in suspension. Thus, the proportion of acid acceptor generally ranges from 0.8 to 1.2 moles.

The following examples are given solely for the purpose of illustration and are not to be construed as limitations of this invention, many variations of which are possible without departing from the spirit or scope thereof.

Example I

Two moles (256 gms.) of high purity acetobutyrolactone were added to a mixture of 170 grams of anhydrous sodium acetate and 600 ml. of glacial acetic acid. Some of the sodium acetate was in solution and the remainder in suspension. The mixture was stirred and about 72 grams of chlorine gas introduced below the surface over a period of 1.25 hours, keeping the reaction temperature at 25–30° C. by means of external cooling. At this point the reaction was essentially complete. The sodium chloride which precipitated during the reaction was filtered. A one-half aliquot was vacuum-distilled after first removing the acetic acid solvent. One hundred fifty-five grams of chloracetobutyrolactone were obtained with the following properties:

$n_D^{20} = 1.4724$; sp. gr. $= 1.317$ at 20° C.; M.P. 2.2–3.0° C.

Analysis.—Calcd. for $C_6H_7ClO_3$: Cl, 21.80. Found: Cl, 21.60.

Example II

Eight and two-tenths grams of anhydrous sodium acetate were dissolved in 80 ml. of glacial acetic acid in a 125 ml. Erlenmeyer flask. Twelve ml. of acetobutyrolactone were added. The flask and contents weighed 157.5 grams. Chlorine gas (7.1 gms.) was introduced into this mixture. The stream of chlorine was stopped when the weight of the flask reached 164.6 grams. Sodium chloride was observed to precipitate soon after the addition of chlorine began. The reaction was kept cool by occasionally placing in a water bath (reaction temperature 25–30° C.). The sodium chloride was filtered and the cake washed with 7–8 ml. of glacial acetic acid. No decarboxylation was observed during the reaction.

About 60 ml. of acetic acid was distilled under vacuum. One ml. of concentrated hydrochloric acid was added to the concentrate from above and the mixture heated at about 80° C. on a steam bath. Evolution of carbon dioxide was detected.

When evolution of carbon dioxide ceased, the material was heated for an additional eight hours at about 100° C. The mixture was then cooled and reacted with 5.5 grams of acetic anhydride, the mass being kept at 90° C. for an additional ten hours. The mixture was cooled and the acetic acid distilled off at reduced pressure. The product was 1-acetoxy-3-chloropentan-4-one.

Thus, it is apparent that by the present process the haloacetobutyrolactone intermediate need not be recovered and purified, but can be used directly in the next phase of known processes for preparing thiamin.

Example III

One hundred seventy-six grams of calcium acetate monohydrate were added to 850 ml. of glacial acetic acid in a three liter flask. Acetic anhydride (102 gms.) was then added and the mixture stirred for five hours in order to remove the mole of water present in the calcium acetate used. Acetobutyrolactone (256 gms.) was then added. Over a period of two hours, chlorine gas (142 gms.) was stirred into the mixture which was kept at a temperature of 35–45° C. (This temperature range is not critical, only convenient.) The mixture was then cooled to 20° C. over a period of one hour and the precipitated calcium chloride filtered. This salt cake was washed with fresh acetic acid (50 ml.) and the wash combined with the main filtrate. The chlorolactone product was recovered by distilling the acetic acid at about 100–200 mm. pressure up to a temperature of 90° C. The product distilled at 80° C. (1–2 mm.). It showed the following properties:

$n_D^{20}$=1.4728, density at 25° C.=1.316
Chlorine (percent of theory)=98%
Yield=280 grams

Example IV

One hundred sixty-four grams of anhydrous sodium acetate were added to 480 ml. of glacial acetic acid followed by 256 grams of acetobutyrolactone. The mixture was stirred for fifteen minutes and then the addition of 160 grams of bromine was begun. All of the bromine was introduced over a period of two hours; the temperature was held in the range of 35–45° C. When reaction was complete, as evidenced by the disappearance of the characteristic color of bromine, the reaction mixture was cooled to 20–25° C. and the precipitate of sodium bromide filtered off. The salt cake was washed with 120–240 mls. of acetic acid and this wash added to the main filtrate. The combined filtrate and wash was then concentrated to a volume of about 500 ml. The yield of α-bromo-α-acetobutyrolactone was 377.6 grams (91.2%) based on a bromine assay. This product was then ready to be decarboxylated, acetylated and converted to thiazole acetate by known methods.

Example V

The procedure of Example I was repeated, simply this time using 600 ml. butyric acid in lieu of the acetic acid and 100 grams of calcium carbonate in lieu of the sodium acetate. The desired α-chloro-α-aceto-γ-butyrolactone was again obtained.

Example VI

The procedure of Example V was repeated, this time employing 160 grams of bromine instead of the 72 grams of chlorine gas. The corresponding α-bromo-α-aceto-γ-butyrolactone was obtained, as in Example IV.

Example VII

The procedure of Example I was again followed, this time using 600 ml. of propionic acid in lieu of the acetic acid and 138 grams of potassium carbonate in lieu of the sodium acetate. The desired chloracetobutyrolactone was once again obtained.

Example VIII

The procedure of Example I was once more repeated, this time employing 600 ml. of chloracetic acid at a temperature of 60° C. in lieu of the glacial acetic acid and 233 grams of sodium chloracetate in lieu of the sodium acetate. The desired chloracetobutyrolactone was obtained as usual.

What is claimed is:

1. A process for preparing an α-halo-α-aceto-γ-butyrolactone which comprises halogenating α-aceto-γ-butyrolactone with a member of the group consisting of chlorine and bromine, in a substantially anhydrous solvent medium selected from the group consisting of lower alkanoic acid containing from 2 to 4 carbon atoms and chloracetic acid, and in the presence of an acid acceptor selected from the group consisting of alkali metal and alkaline earth metal salts of a member of the group consisting of lower alkanoic acid containing from 2 to 4 carbon atoms and chloracetic acid.

2. A process for preparing α-halo-α-aceto-γ-butyrolactone which comprises passing an approximately equimolar amount of a member of the group consisting of chlorine and bromine through a solution of α-aceto-γ-butyrolactone in a substantially anhydrous solvent medium selected from the group consisting of lower alkanoic acid containing from 2 to 4 carbon atoms and chloracetic acid, and in the presence of an acid acceptor selected from the group consisting of alkali metal and alkaline earth metal salts of a member of the group consisting of lower alkanoic acid containing from 2 to 4 carbon atoms and chloracetic acid, while maintaining the temperature of the reaction mixture at between about 20° and about 60° C., removing the solvent medium, and recovering the haloacetobutyrolactone thereby obtained.

3. A process according to claim 1 wherein the solvent medium is glacial acetic acid and the acid acceptor is sodium acetate.

4. A process according to claim 1 wherein the solvent medium is glacial acetic acid and the acid acceptor is calcium acetate.

5. A process according to claim 1 wherein the solvent medium is butyric acid and the acid acceptor is calcium butyrate.

6. A process according to claim 1 wherein the solvent medium is propionic acid and the acid acceptor is potassium propionate.

7. A process according to claim 1 wherein the solvent medium is chloracetic acid and the acid acceptor is sodium chloracetate.

References Cited in the file of this patent

UNITED STATES PATENTS

| | | |
|---|---|---|
| 2,193,858 | Buchman | Mar. 19, 1940 |
| 2,394,644 | Tuerck et al. | Feb. 12, 1946 |
| 2,440,229 | Zumbrunn | Apr. 24, 1948 |
| 2,512,518 | Burtner | June 20, 1950 |